March 24, 1936.  F. G. PRESNELL  2,034,922
BRAKE
Filed Feb. 23, 1934  2 Sheets-Sheet 1

INVENTOR.
FRANK G. PRESNELL
BY Williams, Bradbury,
McCaleb & Hinkle ATTORNEYS

March 24, 1936.  F. G. PRESNELL  2,034,922
BRAKE
Filed Feb. 23, 1934  2 Sheets-Sheet 2
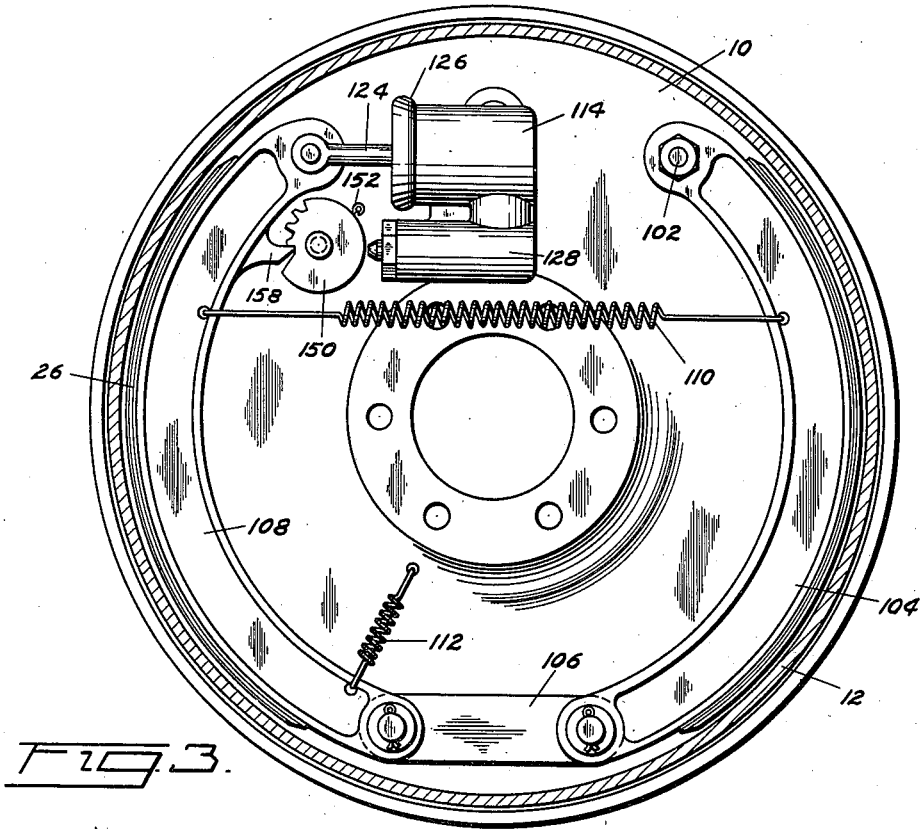
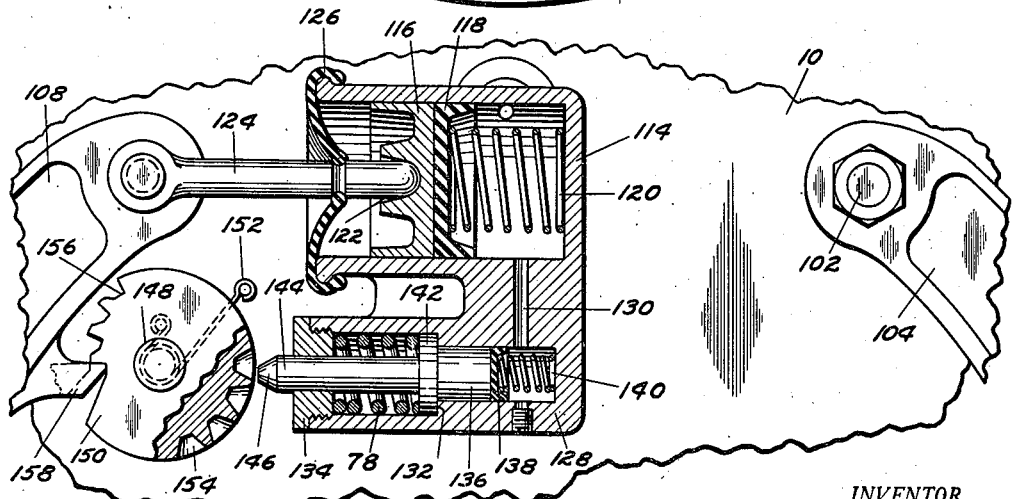
INVENTOR.
FRANK G. PRESNELL
ATTORNEYS Patented Mar. 24, 1936

2,034,922

UNITED STATES PATENT OFFICE 2,034,922

BRAKE

Frank G. Presnell, Chillicothe, Ohio, assignor to Hydraulic Brake Company, Detroit, Mich., a corporation of California Application February 23, 1934, Serial No. 712,462

14 Claims. (Cl. 188—79.5)

This invention relates to brakes, and more particularly to automatic adjustment means for the friction elements of the brake.

In conventional brake structures the friction elements or shoes are lined with friction material, which in use wears away to such an extent as to introduce excess clearance between the friction elements and the drum of the brake, with the result that the range of movement necessary for application of braking forces increases; and therefore the actuating means, such as a foot pedal lever, develops a certain amount of lost motion which is highly undesirable. This lost motion also occurs in instances where the drum becomes distorted due to friction on the brake.

Heretofore various automatic adjusting devices for the friction elements of a brake have been developed but such devices have not proved entirely satisfactory because they function to adjust the friction elements to the drum at times when the drum is distorted, and this results in dragging the friction element on the drum when the drum returns to its static condition.

The present invention aims to overcome these objections by providing means for automatically adjusting the friction elements of the brake only to compensate for wear of the lining material.

An object of the invention is to provide an automatic adjusting means for the friction elements of a brake.

Another object of the invention is to provide an adjusting means for the friction element or elements of a brake of the internal expanding type including means operable only for automatically adjusting the friction elements to compensate for wear on the linings thereof.

A further object of the invention is to provide means for automatically adjusting the friction element of a brake to the drum of the brake to compensate for wear on the linings on the friction elements including means for prohibiting adjustment when the drum is distorted.

Other objects of the invention will appear from the following description taken in connection with the accompanying drawings forming a part of this specification, and in which,—

Figure 3 is a vertical, sectional view taken just back of the drum illustrating a modification of the invention; and Figure 4 is an enlarged fragmentary view of the modification, partly in elevation and partly in section.

Figures 1, 2:
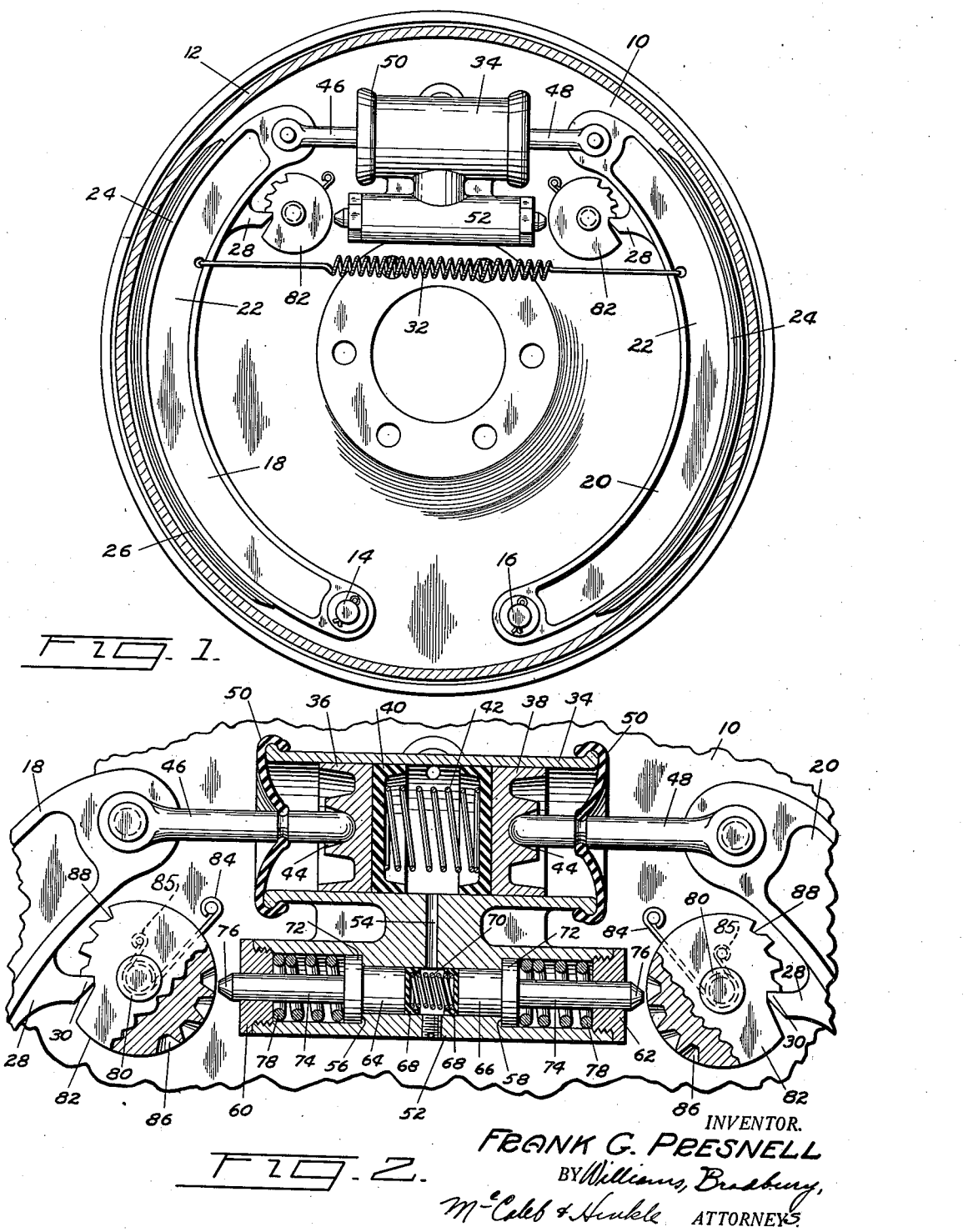
Figure 1 is a vertical, sectional view taken just back of the head of the drum, illustrating in side elevation the friction elements and actuating means embodying the invention.
Figure 2 is an enlarged fragmentary view partly in elevation and partly in section.

Referring to the drawings for more specific details of the invention, 10 represents a fixed support such as a backing plate having associated therewith a drum 12 which may be secured to a wheel, not shown. Spaced anchors 14 and 16 are arranged on the backing plate, and corresponding friction elements or shoes 18 and 20 are pivotally attached to the anchors. Each shoe includes a web 22 supporting a rim 24 to which is suitably secured a lining 26 adaptable for cooperation with the braking surface of the drum, and formed on the web of each shoe is an extension 28 having a wedge-shaped end portion 30, the object of which will hereinafter appear.

As shown, the articulated ends of the shoes 18 and 20 are pivoted on the anchors 14 and 16 and a retractor spring 32 is connected between the separable ends of the shoes. This spring serves to return the shoes to their normal or off position upon release of the force applied to actuate the brake.

Secured on the backing plate between the separable ends of the shoes 18 and 20, is a motor cylinder 34, which may be suitably connected in a conventional fluid pressure system including a compression element. The cylinder has therein corresponding reciprocable pistons 36 and 38 arranged in oppositely disposed relation. The pistons have upon their respective heads leak-proof cups 40 held against displacement by a coil spring 42 interposed between the cups, and formed in the back of each piston is a recess 44.

Thrust pins 46 and 48 pivotally connected to the respective ends of the shoes 18 and 20 extend into the respective ends of the cylinder, and the free ends of the pins are received respectively by the recesses 44. The pins have sleeved thereon flexible dust caps or shields 50 fitted on the outer ends of the cylinder.

A cylinder 52 is arranged parallel to the cylinder 34, and a passage 54 provides communication between the cylinders 34 and 52. The ends of the cylinder 52 have enlarged diameters providing shoulders 56 and 58, and the ends of the cylinder are closed as by plugs 60 and 62 having axial openings.

The cylinder 52 has therein reciprocable pistons 64 and 66 arranged in oppositely disposed relation, and leak-proof cups 68 on the heads of the pistons are held against displacement by coil spring 70 interposed between the cups. Each of the pistons has a sleeve or collar 72 adapted to seat on the shoulders 56 and 58, respectively, when the pistons are in retracted position, and a stem 74 on the back of each piston extends through the openings in the plugs 60 and 62, respectively. These pins are provided with frusto-conical ends 76, and sleeved on the respective pins between the collars 72 and the plugs 60 and 62 are coil springs 78 urging the pistons to retracted position.

Stub shafts 80 positioned on the backing plate have rotatably mounted thereon disks 82, and springs 84 wound on the shafts have their ends 85 connected to the disks and their other ends to fixed supports on the backing plate. These springs impart rotary movement to the disks. Each disk has in its periphery a plurality of conical recesses 86 for the reception of the conical ends 76 on the pins 74, and each disk has a portion cut away to provide a surface eccentric to the disk, and this surface has a ratchet 88 for the reception of the wedge-shaped ends 30 on the extensions 28 on the webs of the respective shoes.

In operation, upon energizing the motor cylinder 34 by the introduction of fluid under pressure, the pistons 36 and 38 are moved in opposite directions, and this movement of the pistons is transmitted to the shoes to spread the shoes into drum engagement. During this operation, pressure in the cylinder 52 is not sufficiently high to actuate the pistons 64 and 66 due to the tension on the retractor springs 78. When the shoes are moved into drum engagement, should the clearance between the linings on the shoes and the drum be excessive due to wear, the lugs 28 on the shoes are disengaged from the ratchets 88, whereupon the disks 82 are rotated by the springs 84 to engage the adjacent tooth of the respective ratchets with the lugs 28.

As pressure in the cylinders 52 builds up, the pistons 64 and 66 are moved to engage the frusto-conical ends 76 of the pins 72 with the conical recesses 86 in the disk. This movement takes place before the drum becomes enlarged due to heat generated in the brake or distorted due to braking torque. The frusto-conical ends 76 on the pins 72 are slightly out of line with the normal position of the conical recesses 86. Accordingly, as the frusto-conical ends 76 seat in the recesses 86 the left-hand disk is given a slight clock-wise rotation and the right-hand disk is given a slight counter-clockwise rotation, resulting in moving the ratchets 88 from the lugs 28 on the shoes, and thereafter the disks are retained against movement to avoid further adjustment because of a distorted drum. The disks are so retained against movement until the applied pressure for actuating the brake is released and the shoes returned sufficiently to position with the lugs 28 for proper engagement with the ratchets 82, which engagement has been facilitated by the clock-wise movement of the disk.

A modification of the invention is illustrated in Figures 3 and 4. In this modification an anchor 102 on the backing plate has pivotally attached thereto a shoe 104 connected as by a link 106 to a shoe 108. The shoes 104 and 108 are connected by a retractor spring 110, and the shoe 108 is connected by a spring 112 to the backing plate. These springs serve to return and retain the shoes in the off position.

Supported on the backing plate is a cylinder 114 which may be suitably connected in a fluid pressure system including a compression element. This cylinder has therein a reciprocatory piston 116 on the head of which is a leak-proof cup 118 held against displacement by a coil spring 120 interposed between the cup and the head of the cylinder, and formed in the back of the piston is a recess 122 for the reception of one end of a pin 124, the other end of which is pivotally attached to the shoe 108, and a conventional flexible dust cap or shield 126 is sleeved on the pin and suitably connected to the open end of the cylinder.

Arranged parallel to the cylinder 114 is a cylinder 128, and a passage 130 provides a communication between the cylinders 114 and 128. The cylinder 128 has a double diametral bore providing a shoulder 132, and the open end of the cylinder is closed by a plug 134 having an axial opening. This cylinder has therein a reciprocatory piston 136 having on its head a leak-proof cup 138 held against displacement by a coil spring 140 interposed between the cup and the head of the cylinder, and on the skirt of the piston is a sleeve or collar 142 adapted to seat on the shoulder 132 when the piston is in retracted position, and on the back of the piston is a pin 144 extending through the opening in the plug 134 and provided with a frusto-conical head 146.

A stub shaft 148 on the backing plate has rotatably mounted thereon a disk 150, and a spring 152 wound on the shaft has its ends connected respectively to the disk and to the backing plate. This spring imparts rotary movement to the disk. The disk has in its periphery a plurality of conical recesses 154 for the reception of the conical head 146 on the pin 144, and a portion of the disk is cut away to provide a surface eccentric to the disk, and this surface has a ratchet 156 for the reception of an extension 158 on the shoe 108.

In operation, upon the introduction of fluid under pressure to the cylinder 114, the piston 116 is moved and this movement of the piston is transmitted through the pin 124 to the shoe 108, resulting in moving the shoe 108 into drum engagement.

During this operation, the pressure in the cylinder 128 is not sufficiently high to actuate the piston 136 against the resistance of the retractor spring 78. As the shoe 108 is moved into drum engagement, should the clearance between the lining on the shoe and the drum be excessive the extension 158 moves out of engagement with the ratchet of the disk 150, resulting in rotation of the disk 150 by the spring 132 to engage the extension 158 with the adjacent tooth on the ratchet 156.

The pressure in the cylinder 128 builds up rapidly upon applying further force to actuate the brakes, and moves the piston 136 to engage the frusto-conical end 146 on the pin 144 with one of the recesses 154 in the periphery of the disk 150. This movement takes place before the drum becomes enlarged due to heat generated in the brake or distorted due to braking torque. The frusto-conical end 146 on the pin 144 is slightly out of line with the normal position of the conical recess 156. Therefore, as the frusto-conical end 146 seats in one of the recesses, the disk is given a slightly clock-wise rotation resulting in disengaging the ratchet 156 from the extension 158 on the shoe 108 and retaining the disk against movement, to avoid readjustment of the shoe to a distorted drum. The disk is held against movement until the applied force for operating the brake is released and the shoe returns sufficiently to position in the extension 158 for proper engagement with the ratchet 156.

While preferred embodiments of the invention have been described, it is to be understood that these are given merely as examples of the underlying principles of the invention, and since these may be incorporated in other specific mechanical structures, I do not intend to be limited to those shown except as such limitations are clearly imposed by the appended claims.

Having thus described the various features of the invention, what I claim as new and desire to secure by Letters Patent is:—

1. An adjustable positioning stop for a brake comprising a disk having recesses and a ratchet eccentric thereto, stop means for limiting rotation of said disk cooperating with said recesses, and a friction element adjustably controlled by said ratchet.

2. An adjustable positioning stop for a brake comprising a rotatable disk having a plurality of spaced recesses in its periphery and a segmental ratchet eccentric to the disk, a stop pin cooperating with said recesses and a friction element adjustably controlled by said ratchet.

3. An adjustable positioning stop for a brake comprising a rotatable disk having a plurality of spaced conical recesses in its periphery, and a portion of its periphery cut away to provide a segmental ratchet eccentrically disposed with respect to the disk, a stop pin cooperating with said recesses to limit rotation of said disk, and a friction element adjustably controlled by said ratchet.

4. In a brake, a rotatable element, a friction element for engagement therewith, an adjustable positioning stop comprising a rotatable member having a ratchet for engagement with the friction element, means for rotating the member in one direction, and means automatically operated for rotating the member in reverse direction and securing the member against movement.

5. In a brake, a rotatable element, a friction element for engagement therewith, an adjustable positioning stop comprising a rotatable member having a ratchet adaptable for engagement by the friction element, means for rotating the member in one direction, and means effective upon application of the brake for rotating the member in reverse direction and securing the member against movement.

6. In a brake, a rotatable element, a friction element for engagement therewith, an adjustable positioning stop comprising a rotatable member having a ratchet eccentrically disposed with respect to the member and adapted to receive the friction element when in off position, means for rotating the member in one direction, and automatically operated means effective upon actuation of the brake to rotate the member in reverse direction and to secure the member against movement.

7. In a brake, a rotatable element, a friction element for engagement therewith, an adjustable positioning stop comprising a rotatable member having a ratchet eccentric to the member and adaptable for the reception of the friction element, means for rotating the member in one direction, and automatically operated means for rotating the member in the opposite direction and locking the member against movement upon actuation of the brake.

8. In a brake, a rotatable element, a friction element for engagement therewith, an adjustable positioning stop comprising a rotatable member having a ratchet thereon eccentric to the member and adaptable for the reception of the friction element, means for rotating the member in one direction, and automatically operated means for rotating the member in the opposite direction and locking the member against movement upon application of the brake.

9. A brake comprising a friction element, an adjusting means therefor including a stop having a segmental ratchet for engagement with the friction element, means for moving the stop in one direction, and automatically operated means for moving the stop in the opposite direction and for locking the stop against movement upon application of the brake.

10. A brake comprising a friction element and adjustable means therefor including a rotatable stop having a segmental ratchet eccentric to the stop for the reception of the friction element, means for rotating the stop in one direction, and means automatically operated for rotating the stop in the opposite direction and securing the stop against movement upon application of the brake.

11. A brake comprising a drum, a friction element for cooperation therewith, hydraulic means for actuating the friction element, and a stop for the friction element including a rotatable member having a ratchet eccentric to the member and adaptable for engagement with the friction element, means for moving the member in one direction, and automatic hydraulically operated means for moving the member in the opposite direction and securing the member against movement upon operation of the hydraulic means for actuating the brake.

12. A brake comprising a drum, a friction element for cooperation therewith, hydraulic means for actuating the friction element and a retractor stop for the friction element including a rotatable disk having spaced conical recesses in its periphery and a ratchet eccentrically disposed with relation to the disk and adaptable for engagement with the friction element, means for rotating the stop in one direction to compensate for wear on the friction element, and automatic hydraulically operated means for rotating the disk in the opposite direction and locking the disk against movement including a pin having a frusto-conical end adaptable for engagement with the recesses in the periphery of the disk.

13. A brake comprising a drum, a friction element for cooperation therewith, a motor cylinder for actuating the friction element, and a retractor stop for the friction element including a disk having a ratchet adapted to receive the friction element and a plurality of recesses in its periphery, means for rotating the disk in one direction, a cylinder communicating with the motor cylinder and a member actuated thereby having a part cooperating with the recesses for rotating the disk in reverse direction and securing the disk against movement upon actuation of the friction element.

14. A brake comprising a drum, a friction element for cooperation therewith, a motor cylinder for actuating the friction element, and a retractor stop for the friction element including a disk having a plurality of spaced conical recesses in its periphery, a ratchet on the disk eccentrically disposed thereto, an extension on the friction element adapted to engage the ratchet when the friction element is in retracted position, a spring for rotating the disk in one direction, a cylinder connected with the motor cylinder, and a member actuated thereby having a frusto-conical portion cooperating with the recesses in the disk for rotating the disk in reverse direction and locking the disk against movement upon actuation of the friction element.

FRANK G. PRESNELL.